United States Patent [19]

Shibata et al.

[11] Patent Number: 4,942,499

[45] Date of Patent: Jul. 17, 1990

[54] WIRE HARNESS COUPLER INSTRUMENT PANELS

[75] Inventors: Tatsumi Shibata; Hideharu Hayashi; Yukio Muramatsu; Masaki Yamamoto, all of Shizuoka, Japan

[73] Assignee: Yazaki Corporation, Tokyo, Japan

[21] Appl. No.: 327,672

[22] Filed: Mar. 23, 1989

[30] Foreign Application Priority Data

Mar. 25, 1988 [JP] Japan .............................. 63-38426[U]

[51] Int. Cl.$^5$ .............................................. H02B 1/04
[52] U.S. Cl. ................................ 361/428; 174/72 A; 307/10.1; 439/34; 439/247
[58] Field of Search ................... 174/72 A; 307/10.1, 307/148; 439/34, 540, 246, 247, 248; 361/331, 346, 347, 358, 417–420, 428

[56] References Cited

U.S. PATENT DOCUMENTS

| | | | |
|---|---|---|---|
| 2,783,443 | 2/1957 | Jencks | 439/372 |
| 4,280,062 | 7/1981 | Miller | 361/428 |
| 4,360,241 | 11/1982 | Fukunaga | 439/34 |
| 4,750,265 | 6/1988 | Watanabe et al. | 29/854 |
| 4,780,090 | 10/1988 | Sugiyama | 439/247 |
| 4,812,133 | 3/1988 | Fleak | 439/248 |
| 4,815,984 | 3/1989 | Sugiyama | 439/248 |

Primary Examiner—Gerald P. Tolin
Attorney, Agent, or Firm—Armstrong, Nikaido, Marmelstein, Kubovcik & Murray

[57] ABSTRACT

A wire harness coupling unit intended for use on a vehicular instrument panel to facilitate coupling of connectors of a wire harness on the instrument panel with corresponding connectors of a wire harness on the dashboard side. The wire harness coupling unit essentially includes: a male coupler member provided on one of the dashboard and instrument panel and carrying connectors of one of the wire harnesses in predetermined positions; a female coupler member provided on the other one of the dashboard and instrument panel in face-to-face relation with the male coupler member and carrying connectors of the other one of the first and second wire harnesses in predetermined positions; the male and female coupler members being engageable with each other upon assembling the instrument panel onto the dashboard to couple the connectors of the two wire harnesses with each other.

5 Claims, 4 Drawing Sheets

WIRE HARNESS COUPLER INSTRUMENT PANELS

BACKGROUND OF THE INVENTION

1. Field of the Invention

The present invention relates to a wire harness coupler suitable for use on vehicular instrument panels, which obviates the troublesome job of manually coupling connectors of a wire harness with corresponding connectors of another wire harness.

2. Prior Art

Illustrated in FIG. 6 is a conventional manner of installation of wire harness on an automobile instrument panel (hereinafter referred to simply as "panel" for brevity). A wire harness Wp on the panel side is provided with a plurality of connectors $C_1$ and $C_2$ at the opposite ends thereof. In the process of connecting these connectors $C_1$ and $C_2$ to corresponding connectors $C_1'$ and $C_2'$ of a wire harness Wd mounted on a dashboard D on the vehicle body side, it has been the conventional practice to rely completely on manual labor, forcing workers to pursue burdensome complicated jobs and thus unavoidably giving rise to incomplete connections.

Namely, for connecting the connector groups $C_1$ and $C_2$ to the connector groups $C_1'$ and $C_2'$, it has thus far been required of the worker firstly to mount the panel P to the dashboard D and then to get into a narrow space under the panel for manually connecting one after another the connectors $C_1$ and $C_1'$ at the expense of a great deal of manpower and time.

SUMMARY OF THE INVENTION

It is an object of the present invention to provide a wire harness coupler which eliminates the above-mentioned problems, more specifically, a wire harness coupler which permits performing a complete coupling of the connectors of a wire harness on an instrument panel with the corresponding connectors of another wire harness on the dashboard automatically upon assembling the panel onto the dashboard.

In accordance with the present invention, there is provided a wire harness coupler for use on a vehicular instrument panel, which includes a first wire harness on the vehicle body side mounted in a dashboard of a vehicle and having a plurality of connectors at the terminal ends thereof; a second wire harness mounted on the instrument panel of the vehicle and having a plurality of connectors at terminal ends thereof; a male coupler member carrying connectors of the wire harness in the predetermined position provided on one of the dashboard and the instrument panel; and a female coupler member carrying the corresponding connectors of the other wire harness provided on the other of the dashboard and instrument panel opposingly to the male coupler member, the male and female coupler members being engageable with each other upon assembling the instrument panel onto the dashboard to couple the connectors of the two wire harnesses on the instrumental panel and dashboard with each other.

The above and other objects, features and advantages of the invention will become apparent from the following description and the appended claims, taken in conjunction with the accompanying drawings which show by way of example preferred embodiments of the invention.

DETAILED DESCRIPTION OF THE PREFERRED EMBODIMENTS

Figure 1:
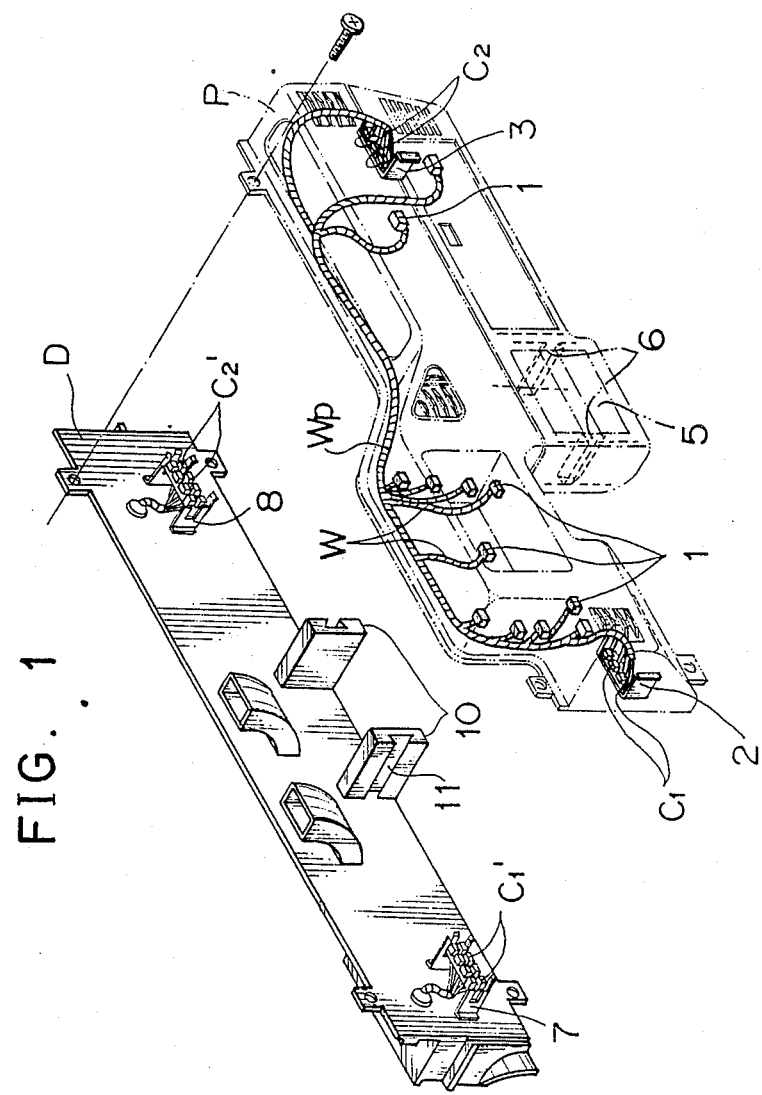
FIG. 1 is an exploded perspective view of a wire harness coupler embodying the present invention.

Hereinafter, the invention is described more particularly by way of preferred embodiments shown in the drawings.

Figure 2:
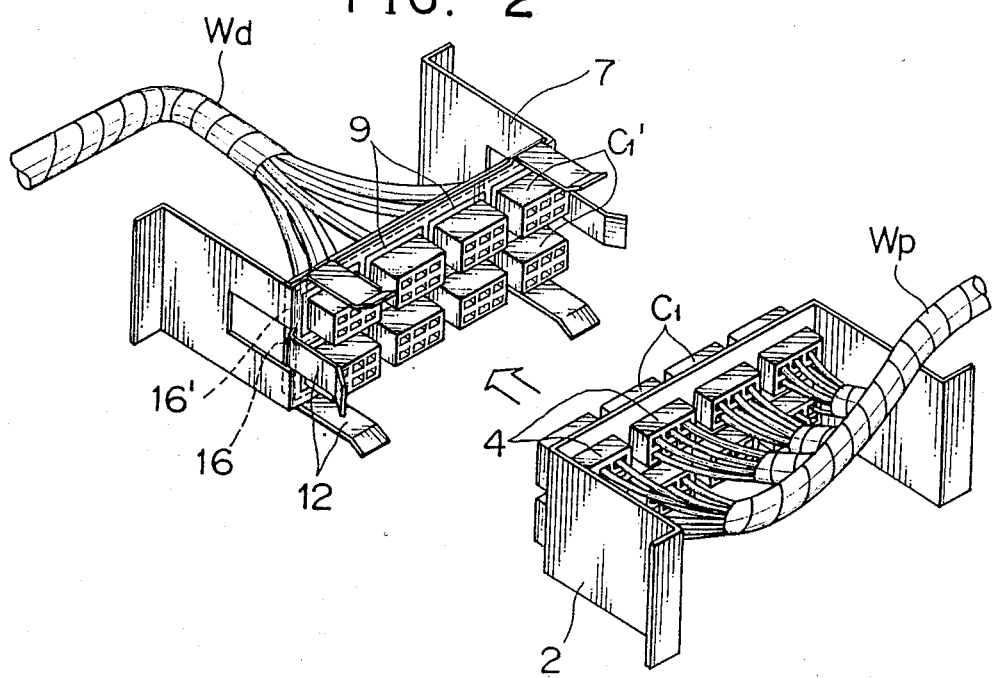
FIG. 2 is an enlarged perspective view of wire harness connectors.
Figure 3:
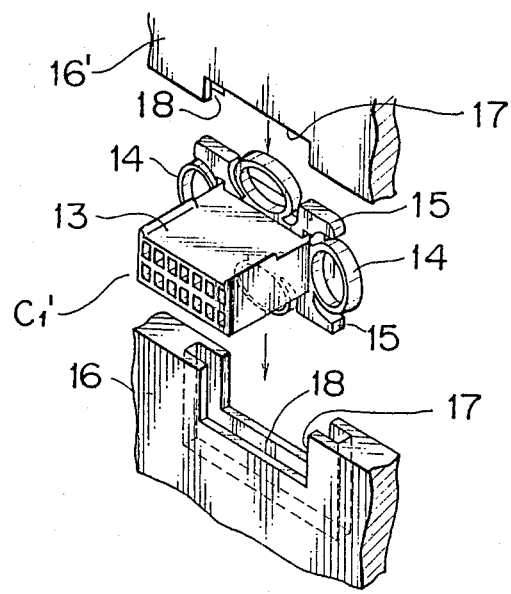
FIG. 3 is an exploded view of a movable mount structure for the connectors of FIG. 2.

Referring to FIGS. 1 to 3, there is shown a dashboard D and an instrument panel P of a vehicle incorporating a wire harness coupler according to the invention, in which the component parts common to the conventional example given above are designated by common reference numerals and characters.

In FIG. 1, a wire harness Wp on the panel P side is fixedly mounted on the panel beforehand and has a plurality of branch portions W extending out from intermediate portions of the harness Wp. Connectors 1 at the terminal ends of the branch portions W are connected to meters, switches and other electric devices within the panel although not shown.

The panel P is provided with brackets 2 and 3 in opposite side portions on its rear side, the brackets 2 and 3 having mount apertures 4 (FIG. 2) in which connector groups $C_1$ and $C_2$ at the opposite ends of the wire harness Wp on the panel P side are securely retained. Dovetail insert members 6 are projectingly provided on the opposite inner side walls of a fitting window 5 in a center console (not shown) in a lower center portion of the panel P.

On the other hand, brackets 7 and 8 are provided on the front side of the dashboard D in face-to-face relation with the above-described brackets 2 and 3, respectively, the brackets 7 and 8 having mount apertures 9 in which connector groups $C_1'$ and $C_2'$ of a harness Wd on the vehicle body side are securely retained. Further, a couple of guide members 10 with dovetail grooves 11 which are engageable with dovetail insert members 6 are protrudingly provided in a center portion of the dashboard D.

The bracket 7 which is paired with the bracket 2 is formed into an integrated structure as shown in FIG. 2, for example, by press-forming or bending a metal sheet, and formed with guides 12, by punching out or bending operation, for guiding the opposing bracket 2 into a coupling position. The connectors $C_1'$ which are installed in the mount apertures 9 are held in position slightly movably in the vertical and lateral directions, forming movable connectors which are capable of absorbing axial deviations relative to the mating connectors $C_1$, when coupled with the latter.

Namely, as shown particularly in FIG. 3, the connectors $C_1'$ are provided with ring-like spring members 14 on four sides of an insulating housing 13, and guide flange members 15 at four corners between the respective spring members 14. Indicated at 16 and 16' are connector mounting plates of split type, which are provided with fitting openings 17 along the abutted side edges thereof. Each opening 17 is provided with a fitting grove 18 around the marginal edge thereof in which the guide flange members 15 and the spring members 14 are to be fitted. After fitting the guide flange members 15 of the connectors $C_1'$ in the openings 17 of these mounting plates 16 and 16' with the spring members 14 pressed against the bottoms of the fitting grooves 18, the two mounting plates are fixed to the rear side of the bracket 7. Whereupon, the connectors $C_1$ are movably held in position.

Although the foregoing description has been directed to a case where the connectors $C_1'$ on the bracket 7 side is movable, the connectors $C_1$ on the bracket 2 side may be made movable if desired. Similarly, it also sufficies to employ the movable mount for one of the connector groups $C_2$ and $C_2'$ which are positioned on the brackets 3 and 8.

Figure 4:
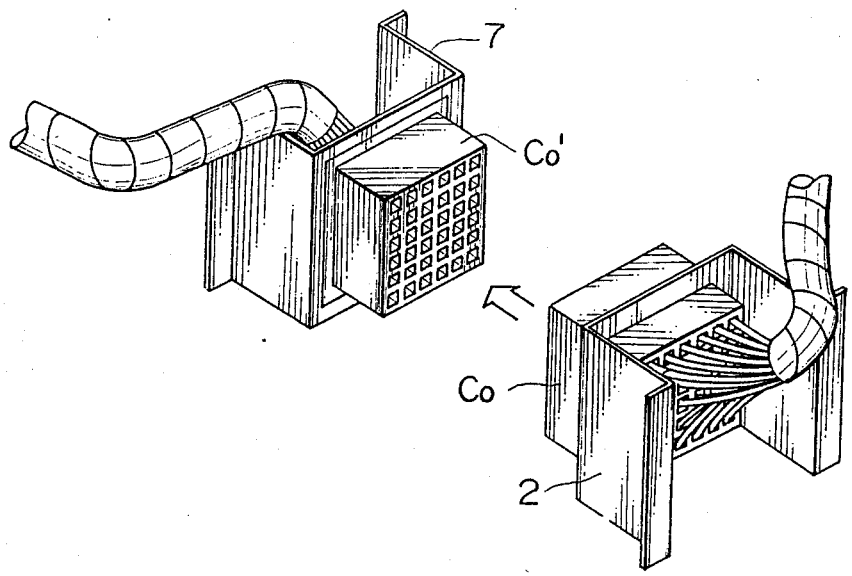
FIGS. 4 and 5 are perspective views showing further embodiments of the invention.

Referring now to FIG. 4, there is illustrated another embodiment of the invention, in which the above-described connector groups $C_1$ and $C_1'$ are integrated into high density multi-polar connectors $C_0$ and $C_0'$, which are securely mounted in position on the brackets 2 and 7, respectively, using the movable mount for one connector $C_0'$ in this particular case.

Figure 5:
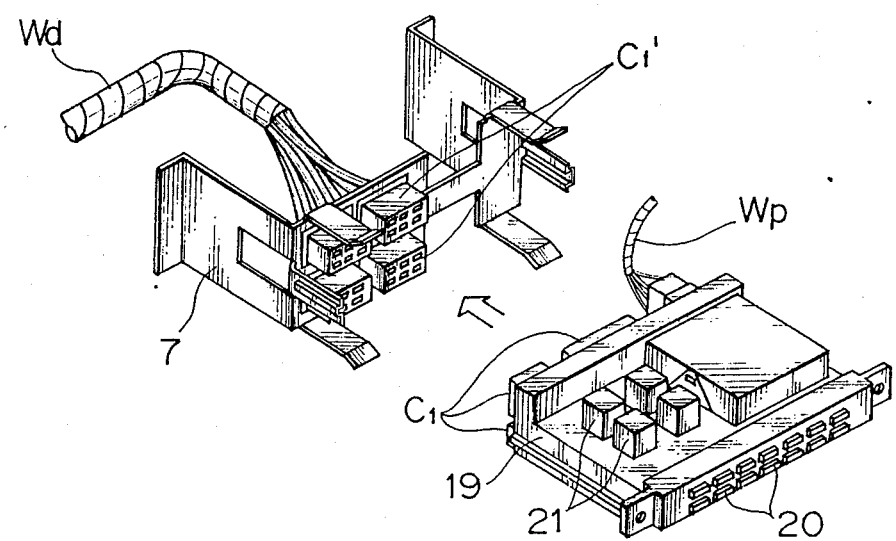
Figure 6:
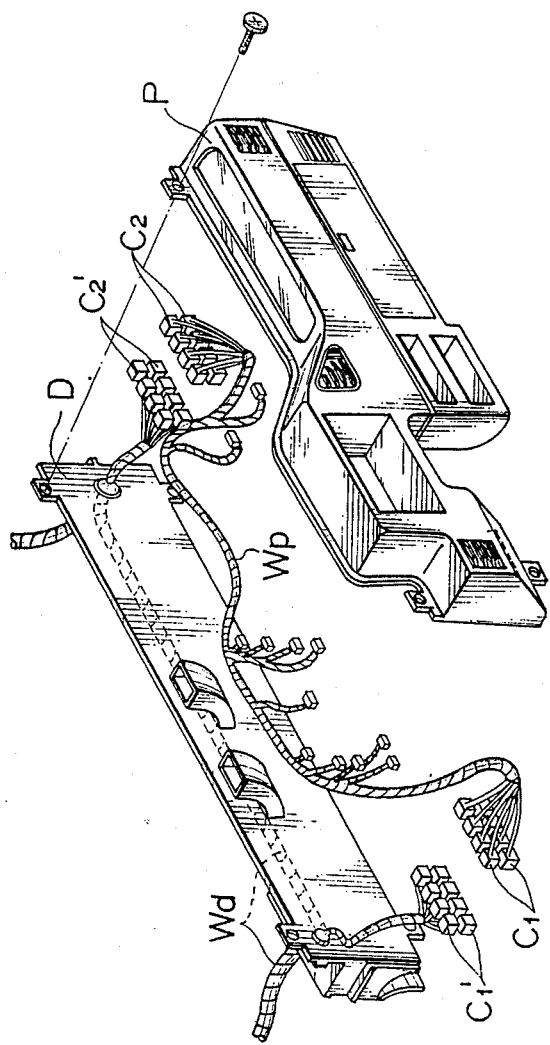
FIG. 6 is an exploded perspective view of a conventional counterpart.

Illustrated in FIG. 5 is another embodiment of the invention, in which the bracket 2 on the panel P side and some parts of the group of connectors $C_1$ are integrated into an electric connection box 19, mounting thereon a group of connectors $C_1$ to be mated with a group of movable type connectors $C_1'$ on the vehicle body side. In this case, the internal space of the bracket 2, shown in FIGS. 2 and 4, can be utilized as an electric junction box which compactly accommodates therein a large number of fuses 20 and relays 21, permitting to simplify the wire harness Wp on the panel side.

According to the present invention, as will be seen from FIG. 1, the connector groups $C_1$ and $C_2$ of the wire harness Wp on the panel side are automatically coupled with the connector groups $C_1'$ and $C_2'$ of the wire harness Wd on the vehicle body side, since the panel P is assembled with the dashboard D by sliding the insert members 6 into and along the dovetail grooves 11 of the guide members 10. By using the movable mount for either one of the mating connector groups $C_1$ and $C_1'$ ($C_2$ and $C_2'$) as shown in FIG. 3, relative deviations in axial alignment can be suitably absorbed by the movable mount to ensure smooth coupling of the connectors, lightening the required positioning accuracy of the connectors.

Accordingly, the present invention obviates the manual labors which have thus far been required for coupling the connectors $C_1$ and $C_1'$ and the like, saving manpower and time to a considerable extent, and permitting to assemble the panel P on the dashboard D by an automatic machine operation. This particularly contributes to improve the productivity of automobile manufacturers.

In a case where not only the connectors of wire harnesses but connection terminals of an electric device like the electric connection box 19, which accommodates a large number of fuses 20 and relays 21 in a compact form as shown in FIG. 5, are also mounted in a predetermined positions on the opposing faces of the panel P and dashboard D, it is possible to electrically connect such terminals simultaneously with the installation of the panel P and to simplify each wire harness.

It will be appreciated from the foregoing description that the coupler device according to the present invention obviates the manual labor for coupling the individual connectors of the wire harness on the panel side with the corresponding connectors of the wire harness on the vehicle body side, permitting to automate the coupling operation. Thus, the coupler is expected to lead to a remarkable improvement in productivity, while preventing erroneous or incomplete connections by obviation of manual labor.

What is claimed is:

1. A wire harness coupling unit for use on a vehicular instrument panel comprising;
   a first wire harness on the vehicle body, mounted on a dashboard of said vehicle and having a plurality of connectors at terminal ends thereof;
   a second wire harness mounted on an instrument panel of said vehicle and having a plurality of connectors at terminal ends thereof;
   a male coupler member carrying connectors of one of said first and second wire harnesses and including a first bracket securely mounted to one of said dashboard and said instrument panel corresponding to said wire harness carried thereon, said first bracket having apertures for securely holding connectors of one of said first and second wire harnesses; and
   a female coupler member carrying connectors of the other one of said first and second wire harnesses being in in face-to-face relation with said male coupler member, and including a second bracket securely mounted to the other of said dashboard and said instrument panel corresponding to said other wire harness carried thereon, said second bracket being positioned opposite said first bracket of said male coupler member for engagement therewith, further said second bracket having apertures for securely holding connectors of the other of said first and second wire harnesses,
   said connectors of at least one of said first and second wire harnesses being movably fitted in said male and female coupler members, and, interengaging guide means independently provided on said dashboard and said instrument panel, aligning flexible clips on one of said first and second brackets, said clips engaging portions of the other of said first and second brackets, whereby
   said male and female coupler members are engaged with each other with said instrument panel assembled onto said dashboard and thereby couple said connectors of said first wire harness with corresponding connectors of said second wire harness.

2. A wire harness coupling unit as defined in claim 1, wherein said female coupler member is provided with said aligning clips for guiding said male coupler member into alignment therewith when coupling the respective connectors.

3. A wire harness coupling unit as defined in claim 1, wherein each connector of said first wire harness is movably fitted in said second bracket of said female coupler member by a plurality of resilient members provided around the circumference of an insulating housing of said connector and fitted in a groove formed around marginal edges of an opening in a mounting plate fixed on a rear side of said second bracket.

4. A wire harness coupling unit defined in claim 1, wherein at least one connector of said first and second harnesses is integrated into multi-polar connector blocks and securely held in said first and second brackets of said male and female coupler members.

5. A wire harness coupling unit as defined in claim 1, wherein said bracket carrying said connectors of said second wire harness is integrally formed with an electric junction box.

* * * * *